United States Patent [19]

Glover et al.

[11] Patent Number: 4,611,887
[45] Date of Patent: Sep. 16, 1986

[54] FIBER OPTIC CONNECTOR ASSEMBLY AND WALL OUTLET THEREOF

[75] Inventors: Douglas W. Glover; John C. Hoffer, both of Harrisburg; Erlon F. Johnson, Elizabethtown; Ronald R. Schaffer, Harrisburg, all of Pa.

[73] Assignee: AMP Incorporated, Harrisburg, Pa.

[21] Appl. No.: 820,926

[22] Filed: Jan. 21, 1986

Related U.S. Application Data

[63] Continuation of Ser. No. 469,344, Feb. 24, 1983, abandoned.

[51] Int. Cl.$^4$ .............................................. G02B 6/38
[52] U.S. Cl. .............................. 350/96.21; 350/96.20
[58] Field of Search ................. 350/96.20, 96.21, 96.22

[56] References Cited

U.S. PATENT DOCUMENTS

| | | | |
|---|---|---|---|
| 4,149,072 | 4/1979 | Smith et al. | 350/96.21 |
| 4,178,068 | 12/1979 | Hoover | 350/96.21 |
| 4,277,135 | 7/1981 | Schrott et al. | 350/96.21 |
| 4,330,172 | 5/1982 | Monaghan et al. | 350/96.21 |
| 4,376,566 | 3/1983 | Blackington | 350/96.20 |
| 4,406,515 | 9/1983 | Roberts | 350/96.21 |
| 4,427,879 | 1/1984 | Becher et al. | 250/215 |
| 4,448,478 | 5/1984 | Matthews et al. | 350/96.21 |
| 4,449,784 | 5/1984 | Basov et al. | 350/96.21 |

OTHER PUBLICATIONS

Noel et al., *IBM Tech. Discl. Bull.*, vol. 22, No. 6, Nov. 1979, "Safety Closure for Fiber Optic Devices", pp. 2393-2394.

*Primary Examiner*—William L. Sikes
*Assistant Examiner*—Frank González
*Attorney, Agent, or Firm*—Adrian J. LaRue; Anton P. Ness

[57] ABSTRACT

A fiber optic connector assembly comprises a housing member having a passageway extending therethrough. A receptacle connector member is latchably mounted in the passageway and has therein fiber optic connectors terminated to ends of fiber optic transmission members and fiber optic cables. The fiber optic connectors are mounted in the receptacle connector member as spring-biased connectors with profiled resilient front ends of the connectors disposed in profiled bores of alignment ferrules that are floatingly mounted in the receptacle connector member. A plug connector member has mounted therein spring-biased fiber optic connectors terminated to ends of fiber optic transmission members. Latch members on the plug connector member latchably secure the plug connector member in the housing member with profiled resilient front ends of the fiber optic connectors being disposed in the profiled bores of the alignment ferrules thereby connecting the respective fiber optic transmission members together under spring forces.

15 Claims, 9 Drawing Figures

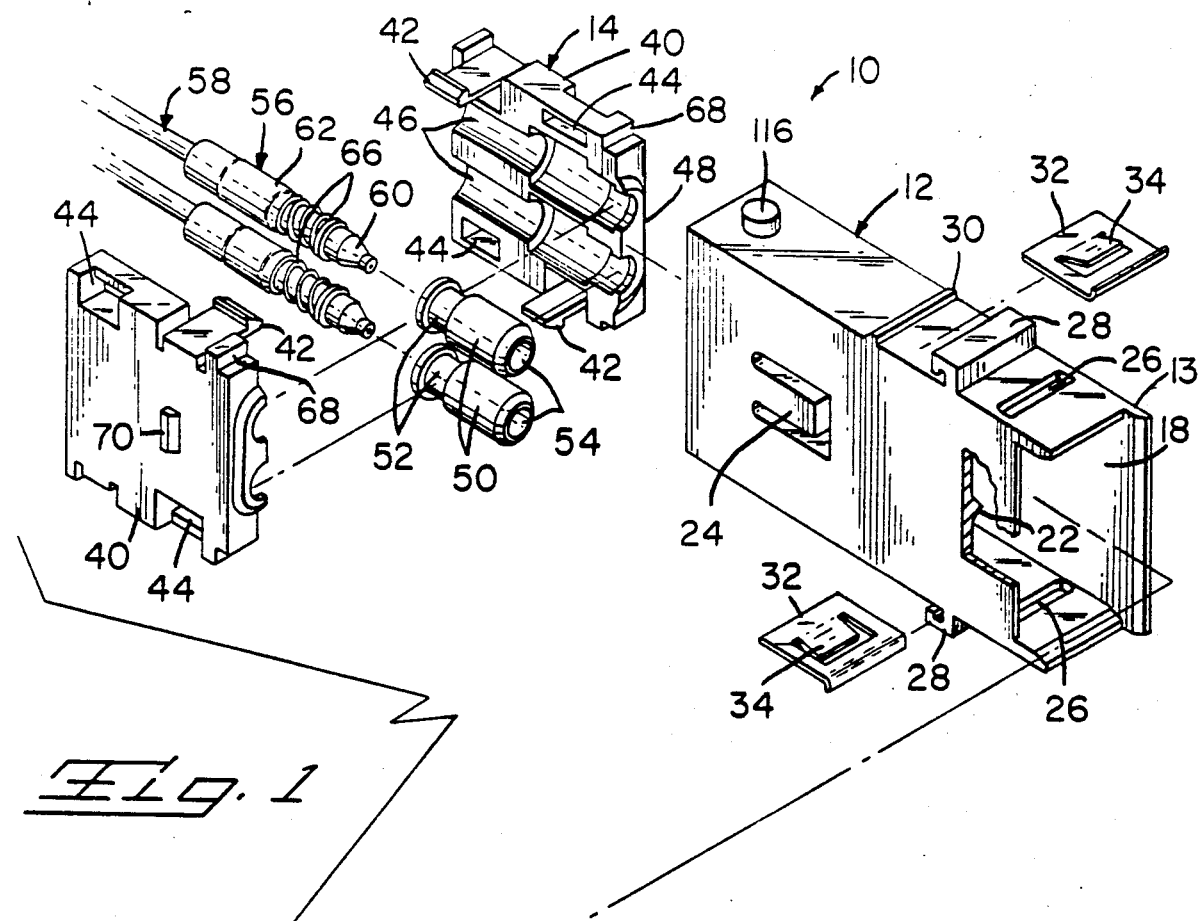
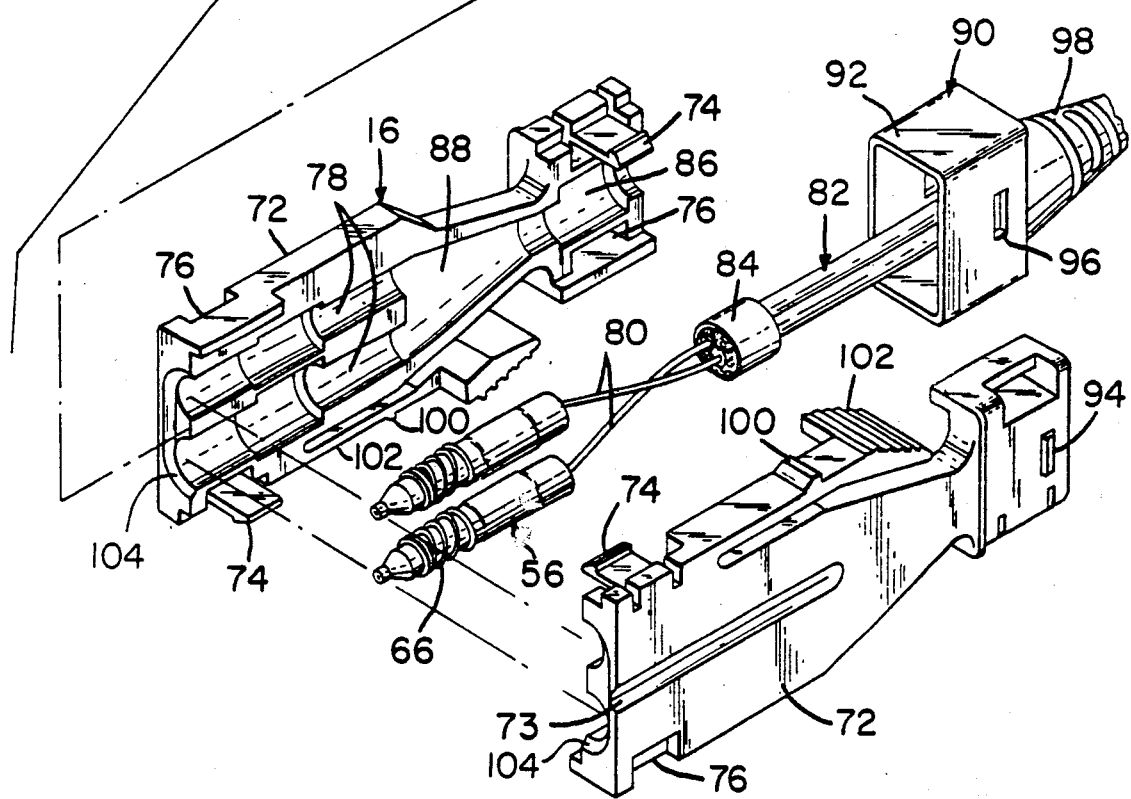
Fig. 1

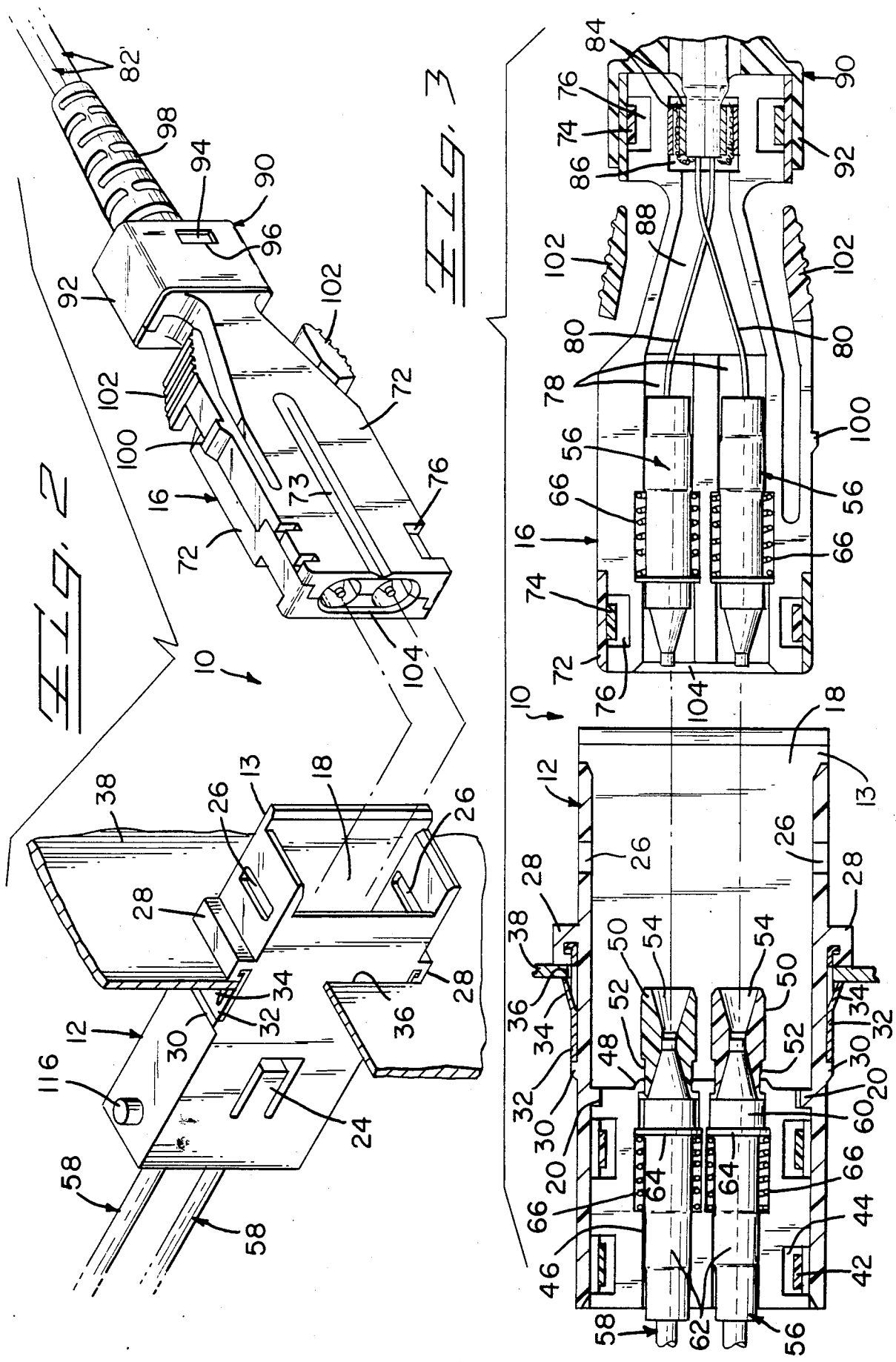

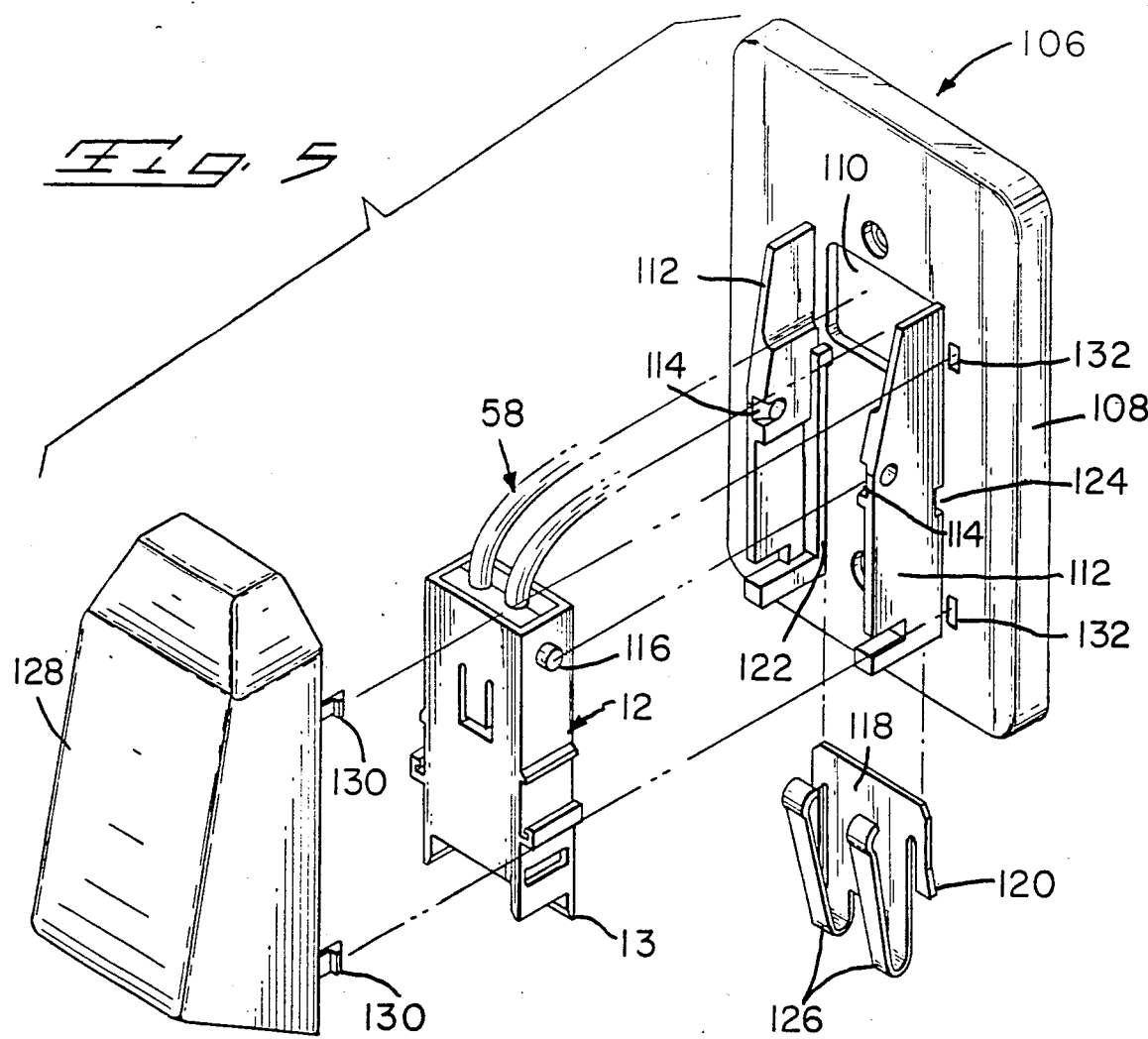
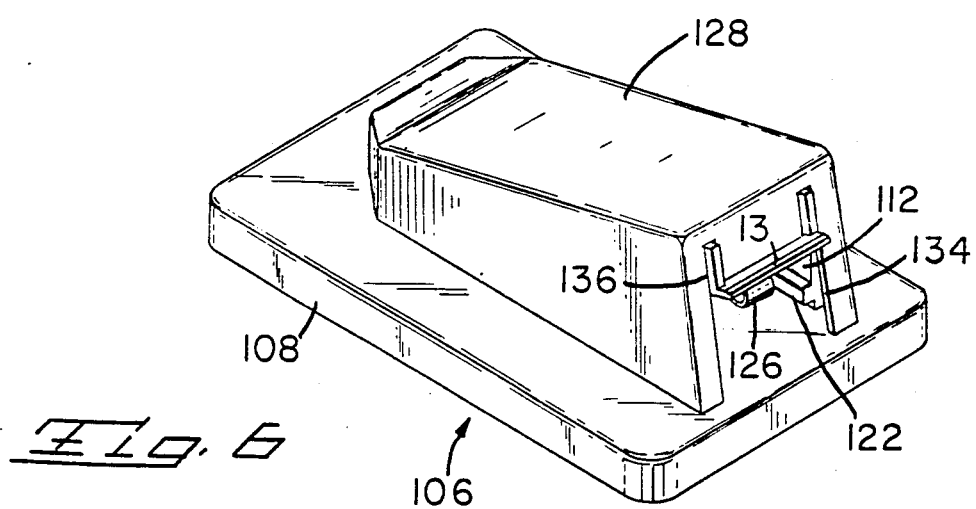

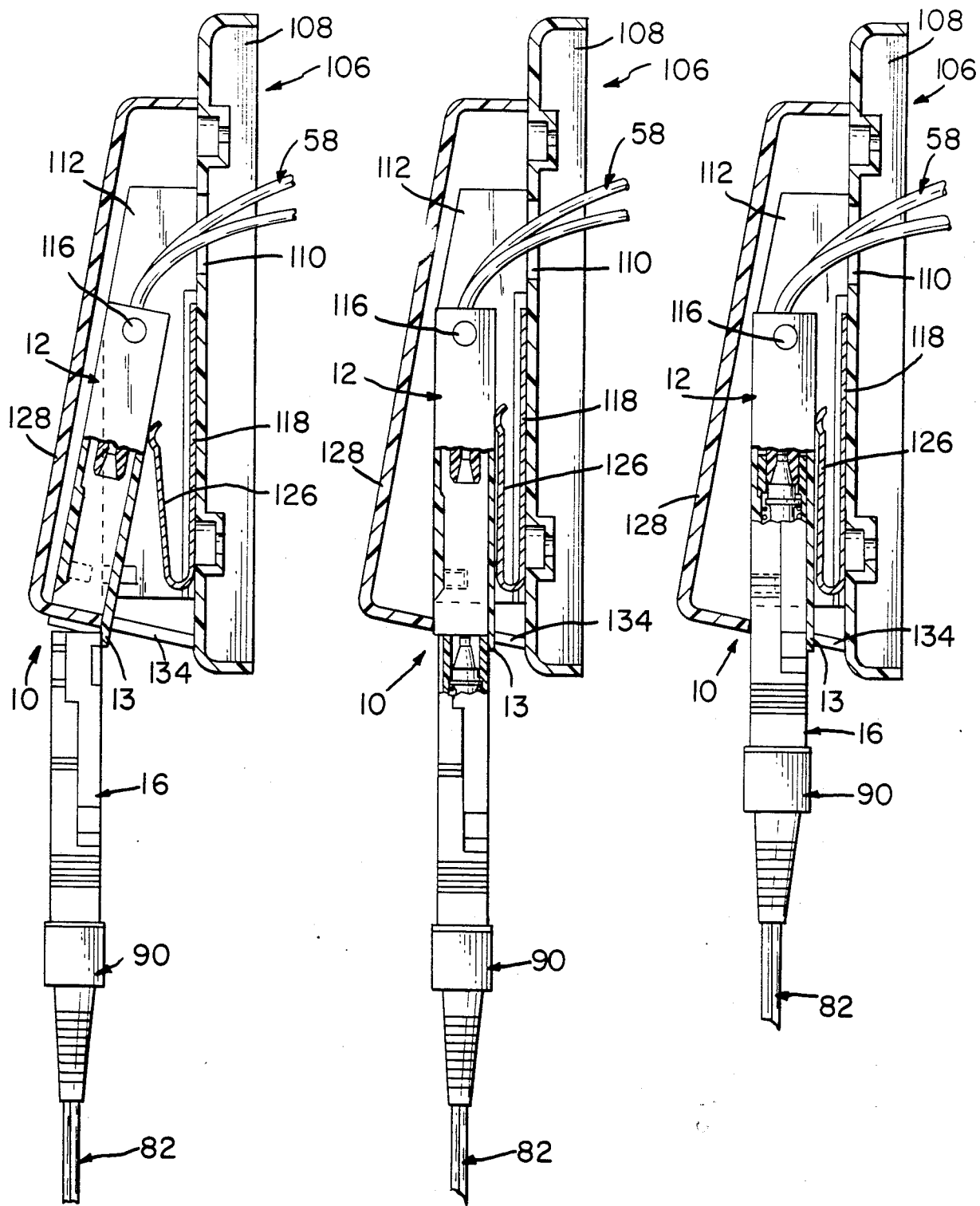

FIBER OPTIC CONNECTOR ASSEMBLY AND WALL OUTLET THEREOF

This application is a continuation of application Ser. No. 469,344 filed Feb. 24, 1983, now abandoned.

FIELD OF THE INVENTION

This invention relates to fiber optic connectors and more particularly to duplex fiber optic connectors and a wall outlet therefor.

BACKGROUND OF THE INVENTION

The need for duplex fiber optic connectors is increasing as the use of fiber optic transmission members is being incorporated in data and other transmission systems. These connectors must be polarized to prevent mismating. They must accurately align terminated ends of fiber optic transmission members for optimum operation. The shape of the connectors is important to improve packing density. The fiber optic transmission members must be able to be easily terminated on location with reliable connectors that are easily mated and latched together to precisely align the ends of the fiber optic transmission members with minimum light loss. One half of the fiber optic connector assembly can be mounted within a wall outlet to protect the connector assembly when in or not in use. The wall outlet must shutter the part of the connector assembly mounted therein when not in use and the shutter acts to guide the mating of the connector members.

SUMMARY OF THE INVENTION

According to the present invention, a fiber optic connector assembly comprises a housing member having a passageway extending therethrough. A receptacle connector member is latchably mounted in the passageway and has therein first fiber optic connectors terminated to ends of fiber optic transmission members and fiber optic cables. The fiber optic connectors are mounted in the receptacle connector member as spring-biased connectors with profiled resilient front ends of the connectors disposed in profiled bores of alignment ferrules that are floatingly mounted in the receptacle connector member. A plug connector member has mounted therein spring-biased second fiber optic connectors terminated to ends of fiber optic transmission members. Latch members on the plug connector member latchably secure the plug connector member in the housing member with profiled resilient front ends of respective first and second fiber optic connectors being disposed in the profiled bores of the alignment ferrules thereby connecting the respective fiber optic transmission members together under spring forces.

According to another embodiment of the invention, the housing member with the receptacle connector member latchably mounted therein is mounted to a spring-biased, channel-shaped shutter member that is pivotally mounted beneath a hood of a wall outlet. The shutter member is biased to a closed position when not in operation and is pivotally moved to an open position by the plug connector member and serves to guide the plug connector member into a latched connection within the housing member.

BRIEF DESCRIPTION OF THE DRAWINGS

FIG. 1 is an exploded and perspective view of the parts of the fiber optic connector assembly.

FIG. 2 is a perspective view of the housing member and receptacle connector member forming a receptacle connector member and a plug connector member exploded therefrom.

FIG. 3 is a longitudinal section view of FIG. 2.

FIG. 5 is an exploded and perspective view of parts of a wall outlet for use in connection with the fiber optic connector assembly.

FIG. 6 is a perspective view of FIG. 5 showing the wall outlet in an assembled condition.

FIGS. 7 through 9 are longitudinal second views of FIG. 6 showing the operation of the wall outlet.

DETAILED DESCRIPTION OF THE INVENTION

Figure 4:
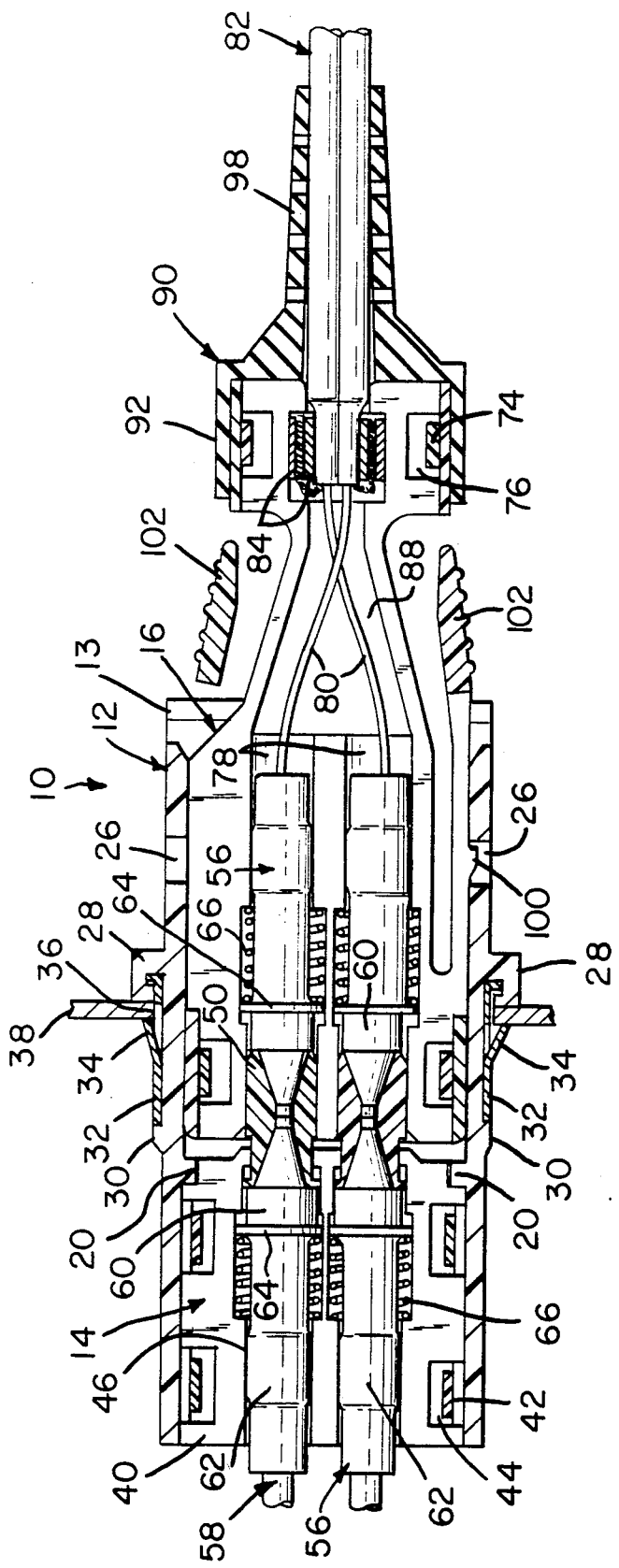
FIG. 4 is a longitudinal section view of FIG. 2 showing the connector assembly in a connected condition.

A fiber optic connector assembly 10 as shown in FIGS. 1 through 4 comprises a housing member 12, a receptacle connector member 14, and a plug connector member 16. Housing member 12 is molded from a suitable plastic material and has a rectangular configuration. Passageway 18 extends through housing member 12 and has stop members 20 on opposing surfaces in addition to a V-shaped projection 22. Integral latches 24 are located in the sides of housing member 12. Openings 26 extend through the sides containing stop members 20 and rearwardly of openings 26 are U-shaped projections 28 which have one of their legs integrally extending from its respective side whereas the other leg is slightly spaced therefrom to enable projections 28 to be flexible. Projections 30 are spaced from respective projections 28, the outer edges of projections 30 being tapered. Metal clips 32 having outwardly-directed lances 34 are disposed under the free legs of U-shaped projections 28 and against projections 30. Metal clips 32 in position on housing member 12 in combination with U-shaped projections 28 serve as latching members of latch housing member 12 in position in an opening 36 of a panel member 38 as shown in FIGS. 2 through 4 if it is desired to mount housing member 12 in such a manner. The flexible projections 28 enables the latching members to accommodate different thicknesses of panel members.

The front end of housing member 12 has a channel-shaped front section with one side 13 extending outwardly further than the other two sides and the sides each have a tapered surface along their inside edges.

Receptacle connector member 14 includes hermaphroditic housing members 40 that are molded from a suitable platic material and are latchably secured together by integral and flexible latching members 42 extending outwardly from opposing sides of housing members 40 at diagonal locations for disposition in respective openings 44 thereby latching the housing members together. Arcuate channels 46 are disposed on the inside surfaces of housing members 40, and when housing members 40 are latchably secured together, oppositely disposed channels 46 form profiled bores along the housing member formed by housing members 40. An oblong projection 48 is formed at the front of housing members 40 when they are latchably secured together which has a beveled edge.

Alignment ferrules 50 have external recesses 52 which enable ferrules 50 to be movably mounted in the front ends of the bores and captured by such bores formed by arcuate channels 46 as shown in FIGS. 3 and 4. A rearward section of each alignment ferrule 50 is contained within a forward portion of each profiled bore formed by channels 46, and a forward section of each alignment ferrule 50 extends forwardly from receptacle connector member 14. Profiled bores 54 extend through alignment ferrules 50 and they have frustoconical forward and rearward outer bore sections contained in the forward and rearward alignment ferrule sections respectively and communicating with an inner cylindrical section.

Fiber optic connectors 56 are terminated onto the ends of fiber optic cables 58. Fiber optic connectors 56 are preferably of the type completely disclosed in U.S. patent application Ser. No. 381,495 filed May 24, 1982 which is completely incorporated by reference herein. However, other types of fiber optic connectors to accomplish the intended result can, of course, be utilized. Fiber optic connectors 56 have ferrule members molded from plastic material having resilient characteristics into which stripped fiber optic transmission members of fiber optic cables 58 are positioned and crimping ferrules 62 having flanges 64 are positioned on ferrule members 60 and controllably crimped onto ferrule members 60 to crimpably secure the fiber optic transmission members in position in connectors 56 as disclosed in the above-identified patent application with the ends of the fiber optic transmission members being coincident with the front surfaces of ferrule members 60. The outer ends of the ferrule members and crimping ferrules are crimped onto the fiber optic cables. Flanges 64 are disposed against annular sections of ferrule members 60 and coil springs 66 are telescopically mounted on crimping ferrules 62. Terminated connectors 56 with coil springs 66 thereon are positioned in channels 46 of one of housing members 40 along with alignment ferrules 50 whereafter the other housing member 40 is latchably secured to the one housing member to secure connectors 56 and alignment ferrules 50 in position therein as shown in FIGS. 3 and 4. In this condition the front profiled sections of ferrule members 60 comprising a frustoconical section and a cylindrical section are disposed in a complementary configuration rearward outer sections and inner cylindrical sections respectively of profiled bores 54 in alignment ferrules 50 and are maintained therein under the spring forces of coil springs 66. The housing member formed by hermaphroditic housing members 40 with the terminated fiber optic connectors and alignment ferrules 50 in position therein are latchably secured within passageway 18 of housing member 12 with stop surfaces 68 of housing members 40 disposed against stop members 20 within passageway 18 and latching members 24 of housing member 12 engaging latching projections 70 on housing members 40 thereby latchably securing receptacle connector member 14 in position therein. Housing member 12 with receptacle connector member 14 latched thereto form a receptacle connector assembly.

Plug connector member 16 comprises hermaphroditic housing members 72 which are molded from a suitable plastic material and are latchably secured together by integral and flexible latching members 74 which are latchably disposed within openings 76 in the same manner that housing members 40 are latched together. Arcuate channels 78 are located in the forward end of housing members 72 and they form profiled bores in which fiber optic connectors 56 with coil springs 66 telescopically disposed thereon are received as shown in FIG. 3 after fiber optic connectors 56 have been terminated to exposed fiber optic transmission members 80 of fiber optic cables 82. The strain relief material for cables 82 is disposed between overlapping ferrules 84 as shown in FIGS. 3 and 4 which have been crimped onto the stripped ends of cables 82 and these ferrules 84 are disposed in opposing channels 86 when housing members 72 are latchably secured together thereby forming a strain relief for the cables and transmission members terminated to fiber optic connectors 56. As can be discerned from FIGS. 3 and 4, fiber optic transmission members 80 are disposed in opposing channels 88 which provide freedom of movement of the transmission members therein when spring-biased connectors 56 are moved within the bores formed by channels 78 thereby preventing undue stress and strain on the transmission members in addition to precluding sharp bends from taking place in the transmission members thereby minimizing light loss therethrough.

A cable strain relief member 90 that is molded from a flexible plastic material and includes a rectangular section 92 which fits snugly onto a rear section of plug connector member 16 and is latched in position thereon by latching projections 94 on housing members 72 which mate with openings 96 in rectangular section 92. This also forms an additional arrangement for holding the latched outer ends of housing members 72 together. A cable-engaging section 98 snugly engages cables 82 and is formed of circular sections connected together at angularly-disposed locations.

With receptacle connector member 14 latchably mounted in housing member 12, housing member 12 can either be free-hanging or mounted in opening 36 of panel 38 as desired, plug connector member 16 can now be matably connected with receptacle connector member 14 within housing member 12 and latchably connected to housing member 12 by latching projections 100 on integral latching arms 102 latchably engaging openings 26 in housing member 12. V-shaped groove 73 in one of housing members 72 mates with V-shaped projection 22 in housing member 12 to make certain that fiber optic connectors 56 in receptacle connector member 14 are properly connected with fiber optic connectors 56 in plug connector member 16. In this condition as illustrated in FIG. 4, forward portions of profiled bores of plug connector member 16 receive thereinto the forward sections of alignment ferrules 50, and the profiled front ends of fiber optic connectors 56 disposed in these forward bore portions of plug connector member 16 are disposed within forward outer sections and inner cylindrical sections of profiled bores 54 of alignment ferrules 50 with the resilient cylindrical ends thereof positioned adjacent or in egagement with the corresponding resilient front ends of fiber optic connectors 56 in receptacle connector member 14 thereby forming an excellent connection between the fiber optic members so that the axes of the fiber optic transmission members are in alignment for optimum operation thereof. The cylindrical front ends of the fiber optic connectors accurately align the axes of the associated fiber optic transmission members within the inner cylindrical bore section of the alignment ferrules as a result of the resilient characteristics of ferrule members 60. The spring forces generated by coil springs 66 maintain the front ends of the fiber optic connectors in aligned engagement and oblong recess 104 of the profiled bores in connector member 16 can mate with oblong projection 48 at the front of receptacle connector member 14. The free-floating condition of alignment ferrules 50 permits the profiled front ends of the fiber optic connectors to be matably aligned therein independent of the other parts of the connector assembly. The profiled font ends of the fiber optic connectors easily mate with the profiled bores of the alignment ferrules 50 with no stubbing problems. The long engaging surfaces between the receptacle connector member and the plug connector member overcome any angular offsets or misalignments when they are connected together. Plug connector member 16 can be readily disconnected from receptacle connector member 14 by depression of latching arms 102 and removing plug connector member 16 from housing member 12.

FIGS. 5 through 9 illustrate a wall mount 106 for fiber optic connector assembly 10. Wall mount 106 comprises a plate 108 which is mounted on a wall where fiber optic cables 58 are located and they extend through opening 110 in plate 108 whereafter they are terminated to fiber optic connectors 56 and mounted in receptacle connector member 14 which is latchably mounted in housing member 12 as hereinabove described. Mounting members 112 are located on plate 108 and they contain recesses 114 into which annular projections 116 on housing member 12 are snappably received to enable housing member 12 to pivot thereabout. A spring assembly 118 has integral latching members 120 which are disposed beneath guide members 122 on mounting members 112 to guide latching members 120 into latching engagement with latching recesses 124 in mounting members 112. The forward end of spring assembly 118 abuts against stop surfaces at the inner ends of guide members 122 when spring assembly 118 is latched in position. Cantilever springs 126 engage against a bottom surface of housing member 12 urging housing member 12 against hood member 128 which is latchably secured onto plate 108 by flexible latching arms 130 which engage the rear surface of plate 108 through openings 132.

Hood member 128 has an opening 134 and slots 136 in communication with opening 134 which accommodate the sides of the channel-shaped front section of housing member 12 so that the upper surface of opening 134 engages the bottom surface of the channel-shaped front section thereby acting as a shutter because housing member 12 is in an inoperative position and is maintained thereat by cantilever springs 126 as illustrated in FIGS. 5 through 7.

When it is desired to connect plug connector member 16 with receptacle connector member 14 within housing member 12, plug connector member 16 is moved into engagement with the bottom surface of the channel-shaped front section of housing member 12 as shown by FIG. 7 and moving housing member 12 against the bias of cantilever springs 126 until passageway 18 is within opening 134 of hood member 128 as shown by FIG. 8 thereby permitting plug connector member 16 to be latchably connected with receptacle connector member 14 as shown in FIG. 9. When plug connector member 16 is disconnected from receptacle connector member 14, housing member 12 is biased to its shuttered inoperative position by spring assembly 118 which protects the receptacle connector member 14.

As can be discerned, a fiber optic connector assembly has been disclosed to connect fiber optic connectors within floating alignment ferrules by long engaging surfaces between connector housings to overcome angular misalignments so that the fiber optic transmission members are precisely aligned. The connector assembly can be used in conjunction with a self-shuttering wall outlet to easily connect equipment within a building to optical data transmission cables.

What is claimed is:
1. A fiber optic connector assembly comprising:
at least one first fiber optic connector means each terminated onto a respective first fiber optic transmission means and a first fiber optic cable means and having a profiled front end means;
a like number of second fiber optic connector means each terminated onto respective second fiber optic transmission means and respective second fiber optic cable means and having a profiled front end means;
a like number of alignment ferrule means each having a profiled bore means extending therethrough, a rearward ferrule section having a rearward bore section to receive a said profiled front end means of a respective first fiber optic connector means, and a forward ferrule section having a forward bore section to receive a said profiled front end means of a respective second fiber optic connector means;
a receptacle connector means having a like number of first bore means each associated with a said first fiber optic connector means and a said alignment ferrule means, each said first bore means including a forward portion, and a ferrule mounting means at a front end thereof;
each said alignment ferrule means being movably mounted by said ferrule mounting means of a respective said first bore means of said receptacle connector means with said rearward ferrule section extending along said forward portion and said forward ferrule section extending forwardly from said receptacle connector means;
each said first fiber optic connector means being disposed in a respective said first bore means of said receptacle connector means with said profiled front end means extending into said rearward profiled bore section of a respective said alignment ferrule means;
a first spring means in each said first bore means engaging said first fiber optic connector means and urging said profiled front end means of said first fiber optic connector means into said rearward profiled bore section;
a plug connector means having a like number of second bore means each associated with a said second fiber optic connector means, each said second bore means including a forward portion;
each said second fiber optic connector means being disposed in a respective said second bore means of said plug connector means with said profiled front end means extending into said forward portion of said second bore means;
a second spring means in each said second bore means engaging said second fiber optic connector means;
a housing means having passageway means therethrough;
said receptacle connector means being securable in one end of said passageway of said housing means such that said forward ferrule second of each said one or more alignment ferrule means extends along said passageway means; and
said plug connector means being positionable in and latchably securable within the other end of said passageway of said housing means so that said forward ferrule section is received within said forward portion of a respective said second bore means and said forward bore section of said alignment ferrule receives a said profiled front end means of said second fiber optic connector means in spring-biasing engagement at least adjacent to said profiled front end means of a respective said first fiber optic connector means in said alignment ferrule means, whereby associated said first and second fiber optic connector means are placed under spring bias by said first and second spring means and said first and second fiber optic transmission means therein are optically connected in axial alignment.

2. A fiber optic connector assembly as set forth in claim 1 wherein polarizing means are located in said housing means and said plug connector means to assure proper orientation of said plug connector means with respect to said housing means.

3. A fiber optic connector assembly as set forth in claim 1 wherein said plug connector means has first channel means and second channel means in communication with each other and with each said one or more second bore means, strain relief means secured on said one or more fiber optic cable means and disposed in said second channel means, each said one or more second fiber optic transmission means extending along said first channel means to permit said second fiber optic transmission means to have freedom of movement therein during movement of said one or more second fiber optic connector means.

4. A fiber optic connector assembly as set forth in claim 3 wherein cable strain relief means includes a section for latchably engaging said plug connector means containing said second channel means and another section snugly engaging said one or more second fiber optic cable means.

5. A fiber optic connector as set forth in claim 1 comprising two first and second fiber optic connector means and alignment ferrule means.

6. A fiber optic connector as set forth in claim 1 comprising one first and second fiber optic connector means and alignment ferrule means.

7. A fiber optic connector receptacle assembly, comprising:
at least one fiber optic connector for transmission onto an associated fiber optic transmission means and fiber optic cable means, each said fiber optic connector having a profiled end including a frustoconical section and a resilient cylindrical front end forwardly thereof;
an alignment ferrule associated with said each fiber optic connector having a profiled alignment bore having a rearward section to receive said profiled front end of said fiber optic connector, and a forward section adapted to receive a correspondingly profiled front end of a mating fiber optic connector;
a receptacle connector member having receptacle housing members securable together, each said receptacle housing member having an arcuate channel associated with each said fiber optic connector such that opposing said arcuate channels cooperate to form a profiled receptacle bore along said receptacle connector member, each said profiled receptacle bore captures a rearward flange of an associated said alignment ferrule when assembled to mount said alignment ferrule forward of said profiled bore in a first position, said alignment ferrule being movable therein, wherein said alignment ferrule is urged by a said mating fiber optic connector received thereto to a second position;
a spring means in each said profiled receptacle bore and engaging an associated said fiber optic connector thereby urging said profiled front end thereof into said rearward section of said profiled alignment bore of said associated alignment ferrule when said fiber optic connector is disposed in said profile receptacle bore and said receptacle housing members are secured together;
a housing having a passageway therein to latchably receive said receptacle connector member having said fiber optic connectors disposed therein and said alignment ferrule mounted thereto, and to latchably receive a mating plug connector having associated mating fiber optic connectors therein; and
said resilient cylindrical front end of said profiled front end of said fiber optic connector member, when disposed within said rearward section of said profiled alignment bore of said alignment ferrule under spring bias, being capable of accurately aligning the axis of said fiber optic transmission member therewithin with the axis of another fiber optic transmission means in said correspondingly profiled front end of said mating fiber optic connector.

8. A fiber optic connector receptacle assembly as set forth in claim 7 wherein said assembly includes two fiber optic connectors.

9. A fiber optic connector receptacle assembly as set forth in claim 7 wherein each said alignment ferrule is freely movable in said profiled receptacle bore.

10. A fiber optic plug connector assembly comprising:
a pair of plug housing members securable together, each said plug housing member having a plurality of arcuate first channels each associated with a fiber optic connector such that opposing said arcuate first channels cooperate to form a like plurality of profiled bores in each of which is disposed a said fiber optic connector with a spring means thereon;
each said fiber optic connector terminated to an associated fiber optic transmission means and a fiber optic cable means, each said fiber optic connector having a profiled front end including a frustoconical section and a resilient cylindrical front end forwardly thereof;
a second channel formed by said plug housing members rearward from and in communication with said profiled bores within which are freely disposed sections of said fiber optic trasmission means rearward of said fiber optic connectors when said connectors are disposed in said profiled bores;
strain relief means secured on said fiber optic cable means disposed in said second channel remote from said fiber optic connectors; and
a forward portion of each of said profiled bores formed by said arcuate first channels radially spaced from and containing therewithin a profiled front end of a respective said fiber optic connector and configured to receive thereinto an end of a respective alignment ferrule means having a profiled bore means therein to receive said profiled front end of said respective fiber optic connector for accurately aligned optical mating with a corresponding fiber optic connector.

11. A fiber optic plug connector assembly as set forth in claim 10 further including a strain relief member disposed on a rear section of said plug housing members when secured together and engaging portions of said fiber optic cable means extending therefrom.

12. A fiber optic wall outlet assembly, comprising:
- plate means for mounting onto a wall from which first fiber optic cable means extend and including an opening through which said first fiber optic cable means extend;
- first fiber optic connector means for termination to first fiber optic transmission means of said first fiber optic cable means;
- receptacle connector means in which said first fiber optic connector means is to be mounted, said receptacle connector means having passageway means leading to said first fiber optic connector means;
- mounting means on said plate means and said receptacle connector means for mounting said receptacle connector means for pivotal movement;
- spring means on said plate means and engaging said receptacle connector means;
- hood means secured to said plate means and covering said receptacle means, said hood means having an aperture;
- section means of said receptacle connector means extends through said aperture and outwardly from said hood means, said spring means biasing said section means against an upper surface of said aperture so that said hood means covers said passageway means thereby acting as a shutter for said receptacle connector means, said section means being engageable by a plug connector means to move said receptacle connector means against said spring means so that said passageway means is in alignment with said aperture and then said plug connector means can be moved along said passageway means to connect said first fiber optic connector means of said receptacle connector means with second fiber optic connector means of said plug connector means.

13. A fiber optic wall outlet as set forth in claim 12, wherein said hood means and said plate means have latching means for latchably securing said hood means to said plate means.

14. A fiber optic wall outlet as set forth in claim 12, wherein section means is channel-shaped and said hood means has slots in communication with said aperture to accommodate sides of said section means.

15. A fiber optic wall outlet as set forth in claim 12, wherein said spring means and said plate means have latch means for latchably securing said spring means in position on said plate means.

* * * * *

UNITED STATES PATENT OFFICE
CERTIFICATE OF CORRECTION

Patent No. 4,611,887     Dated September 16, 1986

Inventor(s) Douglas W. Glover, John C. Hoffer, Erlon F. Johnson and Ronald R. Schaffer It is certified that error appears in the above-identified patent and that said Letters Patent are hereby corrected as shown below:

Claim 2, column 7, line 14, "located in" should be ---located on---.

Claim 7, column 7, line 47, after "profiled" add ---front---.

Claim 7, column 7, line 67, after "profiled" add ---receptacle---.

Claim 7, column 8, line 2, "thereto" should be ---thereinto---.

Claim 7, column 8, line 3, "profile" should be ---profiled---.

Claim 7, column 8, line 14, "ferrule" should be ---ferrules---.

Claim 14, column 10, line 21, after "wherein" add ---said---.

Signed and Sealed this
Second Day of December, 1986

Attest:

DONALD J. QUIGG

Attesting Officer     Commissioner of Patents and Trademarks